Nov. 14, 1967    S. P. GARRETT    3,353,089
ELECTRIC GENERATING SYSTEMS
Filed Sept. 28, 1965

INVENTORS
Sterling P. Garrett

By *John J. Pederson*
Attorney

United States Patent Office 3,353,089
Patented Nov. 14, 1967

3,353,089
ELECTRIC GENERATING SYSTEMS
Sterling P. Garrett, York, Pa., assignor to Wincharger Corporation, a corporation of Minnesota
Filed Sept. 28, 1965, Ser. No. 490,979
5 Claims. (Cl. 322—27)

In many applications of electric power generators, it is desired to maintain a substantially constant output voltage under varying load requirements. Many systems have been devised for achieving this objective, and in the present state of the art, systems are known for maintaining the output voltage constant with almost any desired degree of accuracy.

There are many types of equipment, however, in which extreme accuracy of voltage regulation is not required. For example, gasoline engine driven electric generators are manufactured and sold in numerous sizes as stand-by power generating systems for use in emergencies, or as portable electric power generating systems for use in on-site construction jobs and the like. In such applications, portability, ruggedness, simplicity and economy are prime considerations.

Since the advent of the semiconductor diode, the transistor, and related devices, solid-state voltage regulating systems have been increasingly used because of their compact size and the durability of the solid-state components. However, known solid-state voltage regulating systems are undesirably complex and costly for use in portable or standby engine driven generator sets.

In the copending application of Lawrence R. Roche, Ser. No. 490,422, filed concurrently with this application and assigned to the same assignee as the present invention, there are described and claimed devices and apparatus which are closely related to the present invention.

Accordingly, it is the principal object of the present invention to provide a new and improved electric power generating system in which the output voltage is regulated to accommodate load current variations.

It is a more specific object of the invention to provide a new and improved voltage regulated electric power generating system in which the voltage regulating circuitry is less complex and more economical than those employed in prior systems while maintaining adequate voltage regulation for standby or portable gasoline engine driven generator combinations.

Still another object of the invention is to provide a new and improved electric power generating system for delivering electric power either at a predetermined voltage, essentially independent of ambient temperature and generator load conditions, or alternatively, at the maximum output power permitted by the capacity of the machine.

The invention is adapted for use in a voltage regulated electric generating system in which the output voltage is to be maintained substantially constant at a predetermined level over a wide range of operating loads.

In accordance with this invention, the electric generating system includes an electric generator having an output winding and first and second field windings. First circuit means, responsive to an applied alternating current and including a rectifier, supply exciting current to the first field winding. Second circuit means, also responsive to an applied alternating current and including the last-mentioned rectifier, supply exciting current to the second field winding. Means coupled to the generator output winding and responsive to generator load variations therein increase generator field excitation in response to increasing generator loads.

The features of the present invention which are believed to be novel are set forth with particularity in the appended claims. The organization and manner of operation, together with further objects and advantages thereof, may best be understood by reference to the following description taken in conjunction with the accompanying drawing, in which like reference numerals refer to like elements in the several figures, and in which:

The invention is shown embodied in electrical generating systems of the type commonly used as stand-by or portable sources of electric power. A conventional gasoline engine serves as prime mover in each case and an appropriate electric starting circuit for this engine is included in the circuit diagram of FIGURE 1. No structural details of the engine or generator are included; both are of standard construction and design.

Figure 1:
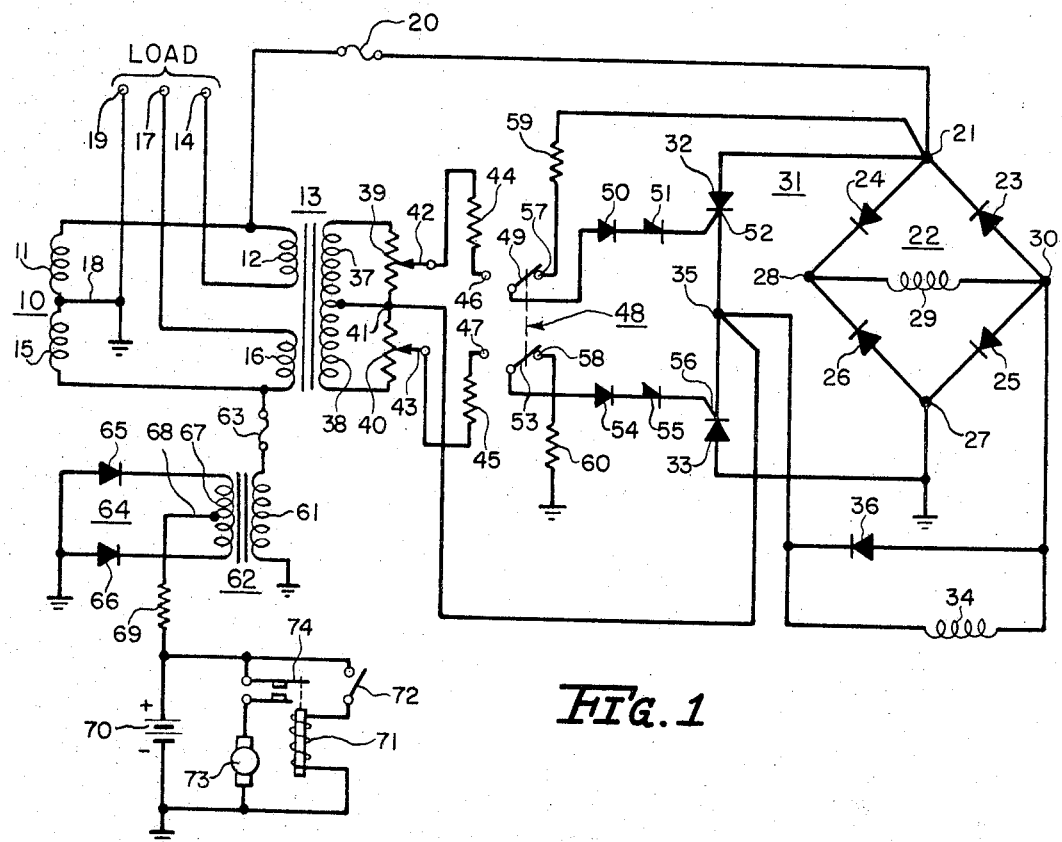
FIGURE 1 is a schematic circuit diagram of a voltage regulated electric power generating system constructed in accordance with one embodiment of the invention.

The electric generator shown in FIGURE 1 has a center-tapped output winding 10 for supplying either 240 volts or 120 volts A.C. to the generator load. A section 11 of this output winding is connected to output terminal 14 by a circuit serially including primary winding 12 of current sensing transformer 13. Winding 15, the other half of the generator output winding, is serially connected to primary winding 16 of transformer 13 and to output terminal 17. Center-tap 18 on output winding 10 is grounded, as is output terminal 19. Full generator output voltage is available across terminals 14 and 17, and one-half this value may be had from either one of these two terminals to ground; i.e. between terminals 14 and 19, or terminals 17 and 19.

Fuse 20 couples one section 11 of output winding 10 to input terminal 21 of a full-wave bridge rectifier network 22, comprising silicon diodes 23, 24, 25 and 26. The cathode and anode electrodes of rectifiers 23 and 24, respectively, are connected to input terminal 21; and the cathode and anode electrodes of 25 and 26, respectively, are connected to the other input terminal 27, which is grounded. Rectifiers 24 and 26 have cathode electrodes connected to output terminal 28 and the anode electrodes of rectifiers 23 and 25 connect at terminal 30. A generator field winding 29 is connected across output terminals 28 and 30 of bridge rectifier network 22 and receives direct current excitation therefrom.

Another bridge rectifier network 31, comprising silicon rectifiers 23 and 25 of bridge rectifier network 22, and silicon controlled rectifiers 32 and 33, supplies controlled direct current to a generator control winding 34. This rectifier network 31 has input terminals 21 and 27 as well as an output terminal 30 in common with rectifier network 22. The cathode electrode of silicon rectifier 23 and the anode electrode of silicon controlled rectifier 32 are connected to input terminal 21; the cathode electrode of silicon rectifier 25 and the anode electrode of silicon controlled rectifier 33 are connected to input terminal 27. The cathode electrodes of silicon controlled rectifiers 32 and 33 connect to a second output terminal 35 of network 31. Control winding 34 is connected across output terminals 30 and 35 of network 31. A transient-suppressing diode 36 shunts control winding 34; its anode and cathode electrodes are connected to terminals 30 and 35, respectively.

The half sections 37 and 38 of the center-tapped secondary winding of current sensing transformer 13 are shunted by potentiometers 39 and 40, respectively. The secondary center-top is connected to juncture 41 of potentiometers 39 and 40, and to output terminal 35 of rectifier bridge 31. The adjustable arms 42 and 43 of potentiometers 39 and 40 are connected serially through current limiting resistors 44 and 45, respectively, to a pair of terminals 46 and 47 comprising one static position, the "voltage regulated" position, of a double-pole double-throw switch 48. One of the transfer contacts 49 of switch 48 is serially connected to a diode 50, a four-layer diode 51, and to the control electrode 52 of silicon controlled rectifier 32. In like manner, the other transfer contact 53 is serially connected to a diode 54, a four-layer diode 55, and to the control electrode 56 of silicon controlled rectifier 33. In the "voltage regulated" mode, switch 48 connects terminal 46 to terminal 49 and terminal 47 to terminal 53.

The four-layer diode, or Shockley diode as it is often called, has a high resistance until the forward-biased voltage across its terminals exceeds a predetermined value, in this case approximately 20 volts. When this value is exceeded, the four-layer diode exhibits an avalanche condition characteristic and its internal resistance becomes negligible. This condition exists until current flow is interrupted, at which time the diode reverts back to its original state of high internal resistance.

Diodes 50 and 54 protect the four-layer diodes 51 and 55 from excessive inverse voltage during the reverse biased portion of the applied alternating current cycle. Resistors 44 and 45 limit current flow through the four-layer diodes when either is conductive. The characteristics of silicon controlled rectifiers 32 and 33 are well known. When the current flow through the gate electrode of a silicon controlled rectifier exceeds a predetermined magnitude, conduction is initiated between its main electrodes. The control electrodes then lose control, and conduction continues until the current through the main electrodes is interrupted.

In the other static position, or "maximum output" position, of switch 48, the generator is not connected for voltage regulated operation, but rather for maximum possible output power as required when handling heavy loads; i.e. motor starting. In this mode, terminal 49 is connected to terminal 57 and terminal 53 to terminal 58. An alternating current is impressed across terminal 57 to input terminal 21 of bridge rectifier networks 22 and 31 and resistor 60 couples terminal 58 to ground. When ing current is applied to control electrodes 52 and 56 of silicon control rectifiers 32 and 33 to cause continuous full-wave direct current energization of control winding 34.

A starting and battery charging circuit for the primary mover of the system is also included in the figure. One terminal of the primary winding 61 of stepdown transformer 62 is connected by a fuse 63 to section 15 of the generator output winding 10. The other terminal of primary winding 61 is grounded, and transformer 62 is energized with alternating current from output winding 10 of the generator. A full-wave rectifier network 64 comprising silicon diodes 65 and 66 is connected to the center-tapped secondary 67 of transformer 62 to supply a direct current battery charging circuit. The cathode electrodes of rectifiers 65 and 66 are connected to respective ends of the secondary winding 67 and the rectifier anodes are grounded. Center-tap 68 of secondary winding 67 is connected serially through a current limiting resistor 69 to the positive electrode of a battery 70 and the negative battery electrode is grounded. A starting solenoid 71 and a starting switch 72 are serially connected across the battery so that solenoid 71 will be energized by the battery when switch 72 is operated. A starting motor 73 for the prime mover of the system is serially connected with contacts 74, operable by solenoid 71, across battery 70. When solenoid 71 is actuated starting motor 73 is energized to turn the gasoline engine which serves as prime mover for the generator.

In operation, after starting motor 73 has caused the prime mover to start, an alternating current is developed in generator output winding 10 and is delivered to rectifier 22 to energize field winding 29. It is also delivered to the load that has been connected to terminals 14, 17, and 19. An A.C. signal proportional to the generator load current is developed in the secondary winding of current sensing transformer 13. With respect to the center-tap, the signals induced in the two sections 37 and 38 of the secondary winding are 180° out of phase and these signals are used in regulating the system.

For this purpose, switch 48 is closed against contacts 46, 47 which renders the regulator operative and it will be assumed that potentiometers 39, 40 are adjusted to effect two steps of regulation at two discretely different levels of load. In particular, assume that the critical voltage is reached at the tap of potentiometer 39 at one predetermined load level and that this voltage level is reached at the tap of potentiometer 40 at another fixed but greater load condition. Based on these assumptions, the operation of the regulator is as follows:

For conditions of no-load, there is no current in winding 10 and, of course, there is no regulation on the system. As the load is applied, however, the current in output winding 10 builds up and ultimately, when the first predetermined load level is reached, the output voltage at the tap of potentiometer 39 is of sufficient magnitude to cause four-layer diode 51 to break down. The resulting current flow through control electrode 52 causes silicon controlled rectifier 32 to conduct. Since silicon controlled rectifier 32 is contained in bridge rectifier network 31 which supplies controlled direct current to a second generator field winding or control winding 34, excitation of the generator is increased. Of course, silicon controlled rectifier 32 conducts current to winding 34 only during those half cycles of the applied alternating current which bias the rectifier to conduction. Conduction in the rectifier is terminated at the conclusion of each such half cycle but is reinstated at the next half cycle of approximate polarity, assuming that the load condition has remained unchanged. As a consequence, there is a certain average current in auxiliary field winding 34 which increases the field of the generator to the end that this load condition may be sustained with better regulation than otherwise, that is to say, with substantially constant output voltage.

If the load on the system should be further increased, a second predetermined load current is finally reached at which the voltage at the tap of potentiometer 40 causes four-layer diode 55 to become conductive and activate silicon controlled rectifier 33.

Of course, rectifier 32 will have been made conductive at the lower load condition and it remains active for this higher load. Accordingly, full-wave rectification takes place in network 31 and the direct current excitation applied to control winding 34 assumes a higher level as required to accommodate the increased load with acceptable regulation. In this fashion two steps of regulation at different but predetermined conditions of load current are attained.

When switch 48 is in the "maximum power," or unregulated position, the four-layer diodes 51 and 55 are connected through switch contacts 57, 58 directly to the output winding 10 of the generator. Since the applied alternating voltage exceeds the breakdown potential of the four-layer avalanche diodes, silicon controlled rectifiers 32 and 33 become conductive during alternate cycles. In this operating mode, the generator receives maximum excitation at all times; a condition particularly desirable when starting heavily loaded motors.

Field winding 29 receives direct current excitation from full-wave bridge rectifier network 22 regardless of the setting of switch 48. Fuses 20 and 63 protect the generator from overload in the event that a short circuit develops.

Referring to the battery charging and electric starting circuits of FIGURE 1, the primary winding 61 of transformer 52 is energized by alternating current derived from output winding 10. Full-wave rectifier 64 rectifies this current to charge battery 70 through current limiting resistor 69. When switch 72 is closed to energized motor 73, starting solenoid 71 is actuated and closes contacts 74 which connect starter 73 across battery 70, thus energizing the motor and cranking the gasoline engine.

Figure 2:
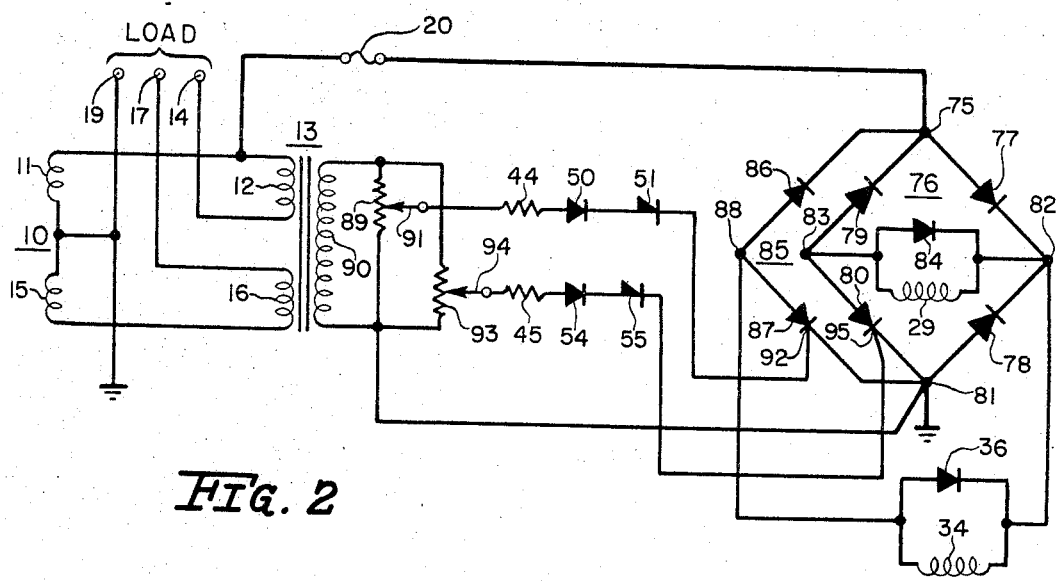
FIGURE 2 is a schematic diagram of another embodiment of the invention.

FIGURE 2 illustrates another embodiment of the invention in which the energization of the main field winding, as well as the control or auxiliary field winding, is controlled as a function of generator load current. In other respects, the operation of the embodiment of FIGURE 2 is generally similar to that of FIGURE 1.

In FIGURE 2, fuse 20 couples output winding 10 to one input terminal 75 of a full-wave bridge rectifier network 76, comprising silicon diodes 77, 78, and 79 and a silicon controlled rectifier 80. The other input terminal 81 is grounded, and consequently alternating current is impressed across the rectifier network. The anode and cathode electrodes of rectifiers 77 and 79 respectively are connected to input terminal 75, and the anode electrode of rectifier 78 and the cathode electrode of silicon controlled rectifier 80 are connected to input terminal 81. The cathodes of rectifiers 77 and 78 connect to one output terminal 82, and the anode electrodes of rectifier 79 and silicon controlled rectifier 80 connect to the other output terminal 83. The main field winding 29 is connected across output terminals 82 and 83, and receives controlled direct current excitation therefrom. Transient suppressing diode 84 is shunted across winding 29, having its cathode and anode electrodes connected to output terminals 82 and 83 respectively.

A second full-wave bridge network 85 comprising silicon diodes 77, 78, and 86 and a silicon controlled rectifier 87, has input terminals 75 and 81 and an output terminal 82 in common with bridge rectifier network 76. In this network, the anode and cathode electrodes of rectifiers 77 and 86 respectively connect at input terminal 75, and the anode electrode of rectifier 78 and the cathode electrode of silicon controlled rectifier 87 connect at input terminal 81. The anode electrodes of rectifier 86 and silicon controlled rectifier 87 connect to output terminal 88. A second generator field winding or control winding 34, is connected across output terminals 82 and 88 and receives controlled direct current excitation therefrom. Like diode 84, diode 36 is shunted across winding 34 to suppress transients, the cathode and anode electrodes of diode 35 being connected to output terminals 82 and 88 respectively.

A potentiometer 89 is shunted across secondary winding 90 of current sensing transformer 13. The arm 91 of this potentiometer is connected to control electrode 92 of silicon controlled rectifier 87 by a circuit serially including current limiting resistor 44, diode 50, and four-layer diode 51. In like manner, potentiometer 93 is shunted across winding 90 and its arm 94 is serially connected by current limiting resistor 45, diode 54, and four-layer diode 55 to control electrode 95 of silicon controlled rectifier 80.

In operation, silicon controlled rectifiers 80 and 87 are triggered in a manner similar to that of silicon controlled rectifiers 32 and 33 in FIGURE 1. However, in this case the control signals are in phase and a center-tapped secondary is not required on current sensing transformer 13.

Under no-load conditions neither of the silicon controlled rectifiers 80 and 87 is conductive, and consequently, field winding 29 and control winding 34 are both excited with direct current derived from half-wave rectification in bridges 76 and 85, respectively. As the generator load current increases, and a first predetermined load current is exceeded, the four-layer avalanche diode 55 becomes conductive and initiates conduction in silicon controlled rectifier 80. This establishes full-wave rectification in network 76, and consequently, field winding 29 receives increased direct current excitation and generator output voltage is increased. When a second predetermined generator load condition is exceeded, four-layer diode 51 becomes conductive and initiates conduction in silicon controlled rectifier 87. At this time network 85 accomplishes full-wave rectification and control winding 34 receives increased excitation.

The switch 48 for selecting between "voltage regulated" and "maximum output" operating modes shown in FIGURE 1 has been omitted from the circuit of FIGURE 2 for purposes of simplification. Also omitted were the battery charging and electric starting circuits shown in FIGURE 1. These omissions are a matter of choice and in no way affect the operation of this embodiment of the invention.

The subject regulator system is intended for use with generators requiring a relatively uncomplicated and inexpensive static regulator system. Not withstanding its low cost, this system is capable of regulating generator output within plus or minus 3% from no-load to full-load. It is also relatively immune to environmental changes in temperature.

This system does not provide for continuous control of generator field excitation, but rather adjusts generator field excitation to one of three predetermined states depending on generator load current. Referring to the embodiment of FIGURE 1, under no-load conditions field excitation is in a first state; all silicon controlled rectifiers are in a blocking mode and the only excitation to the generator field is that provided by a direct current through the main field winding. A second state is entered when the generator output load exceeds a first predetermined magnitude. In this second state, one of the silicon controlled rectifiers is made conductive and additional excitation is provided to the generator field by applying half-wave pulses of current through a control winding. As the load again increases, a second predetermined level is reached where the remaining silicon controlled rectifier is made conductive. A third state of field excitation then results, since now full-wave rectification occurs to increase the direct current applied to the auxiliary field winding and the generator receives maximum excitation.

Keeping in mind the need for economy, of special interest is the novel use made here of rectifiers as elements common to two separate rectifier networks. In the embodiment of FIGURE 1, the rectifiers so employed are silicon diodes 23 and 25 contained in bridge rectifier network 22 and 31. Obviously, this inventive combination is not limited to bridge rectifier networks, but is applicable to any rectifier network which includes a plurality of rectifier elements.

The novel use of multiple layer diodes, four-layer diodes in this embodiment, for determining the load current levels at which the silicon controlled rectifiers will become conductive, has significantly contributed to the temperature stability of this regulator. This feature is described and claimed in the aforementioned copending application of Lawrence R. Roche.

While two particular embodiments of the present invention have been shown and described, it will be obvious to those skilled in the art that changes and modifications may be made without departing from the invention in its broader aspects. Accordingly, the aim in the appended claims is to cover all such changes and modifications as may fall within the true spirit and scope of the invention.

I claim:

1. A voltage regulated electric generating system in which the output voltage is maintained substantially constant at a predetermined level over a wide range of operating loads, said system comprising:

an electric generator having an output winding and first and second field windings;

first circuit means including a rectifier for supplying exciting current to said first field winding;

second circuit means including said rectifier for supplying exciting current to said second field winding;

and means coupled to said output winding and responsive to load current variations therein for increasing the field excitation of said generator in response to increasing generator loads.

2. A voltage regulated electric generating system in which the output voltage is maintained substantially constant at a predetermined level over a wide range of operating loads, said system comprising:
- an electric generator having a field winding, a control winding, and an output winding;
- a first circuit means responsive to an applied alternating current and including a rectifier for supplying direct current to said field winding;
- a second circuit means responsive to an applied alternating current and including said rectifier and an intermittently conductive controllable rectifier device for supplying controlled direct current to said control winding;
- and means coupled to said output winding and responsive to load current variations therein for controlling the conduction state of said intermittently conductive controllable rectifier device to vary the excitation of said control winding.

3. A voltage regulated electric generating system in which the output voltage is maintained substantially constant at a predetermined level over a wide range of operating loads, said system comprising:
- an electric generator having a field winding, a control winding and an output winding;
- a first circuit means responsive to an applied alternating current and including a rectifier and an intermittently conductive controllable rectifier device for supplying controlled direct current to said field winding;
- a second circuit means responsive to an applied alternating current and including said rectifier and an intermittently conductive controllable rectifier device for supplying controlled direct current to said control winding;
- means coupled to said output winding and responsive to load current variations therein for controlling the conduction state of said intermittently conductive controllable rectifier devices to vary the excitation of said field and control windings.

4. A voltage regulated electric generating system in which the output voltage is maintained substantially constant at a predetermined level over a wide range of operating loads, said system comprising:
- an electric generator having a field winding, a control winding, and an output winding;
- a first circuit means responsive to an applied alternating current and having a bridge rectifier network including a plurality of rectifier elements for supplying direct current to said field winding;
- a second circuit means responsive to an applied alternating current and having a bridge rectifier network including at least one of said rectifier elements and an intermittently conductive controllable rectifier device for supplying controlled direct current to said control winding;
- means coupled to said output winding and responsive to load current variations therein for controlling the conduction state of said intermittently conductive controllable rectifier device to vary the excitation of said control winding.

5. A voltage regulated electric generating system in which the output voltage is maintained substantially constant at a predetermined level over a wide range of operating loads, said system comprising:
- an electric generator having a field winding, a control winding, and an output winding;
- a first circuit means responsive to an applied alternating current and having a bridge rectifier network including a plurality of rectifier elements and a first intermittently conductive controllable rectifier device for supplying controlled direct current to said field winding;
- a second circuit means responsive to an applied alternating current and having a bridge rectifier network including at least one of said rectifier elements and a second intermittently conductive controllable rectifier device for supplying controlled direct current to said control winding;
- means coupled to said output winding and responsive to load current variations therein for controlling the conduction state of said first and second intermittently conductive controllable rectifier devices to vary the excitation of said field and control windings.

References Cited

UNITED STATES PATENTS

| | | | |
|---|---|---|---|
| 3,032,699 | 5/1962 | Kahle | 322—25 X |
| 3,032,701 | 5/1962 | Krauaz | 322—73 X |
| 3,120,634 | 2/1964 | Genuit | 321—18 X |
| 3,201,679 | 8/1965 | Buchanan et al. | 322—25 |

MILTON O. HIRSHFIELD, *Primary Examiner.*

J. D. TRAMMELL, *Assistant Examiner.*